United States Patent [19]

Besson et al.

[11] 4,021,531
[45] May 3, 1977

[54] PROCESS FOR THE SEPARATION OF ZIRCONIUM AND HAFNIUM TETRACHLORIDES FROM MIXTURES THEREOF

[75] Inventors: Paul Besson, La Chambre; Jean Guerin; Pierre Brun, both of Grenoble; Michel Bakes, La Celle-Saint-Cloud, all of France

[73] Assignee: Ugine Aciers, Paris, France

[22] Filed: Apr. 15, 1976

[21] Appl. No.: 677,277

Related U.S. Application Data

[63] Continuation of Ser. No. 447,902, March 4, 1974, abandoned.

[30] Foreign Application Priority Data

Nov. 14, 1973   France .............................. 73.40395

[52] U.S. Cl. ................. 423/492; 423/73; 423/81; 423/210.5
[51] Int. Cl.² ................. C01G 25/04; C01G 27/04
[58] Field of Search ............... 423/492, 73, 69, 81, 423/210.5

[56] References Cited

UNITED STATES PATENTS

| 2,744,060 | 5/1956 | Eaton ................................. 423/73 |
| 2,852,446 | 9/1958 | Bromberg .................... 423/492 UX |
| 3,294,482 | 12/1966 | Lerner ......................... 423/492 X |
| 3,407,031 | 10/1968 | Fuerer et al. ...................... 423/492 |
| 3,671,186 | 6/1972 | Ishizuka .............................. 423/492 |

FOREIGN PATENTS OR APPLICATIONS

| 160,108 | 12/1954 | Australia ........................... 423/492 |
| 207,659 | 4/1957 | Australia ........................... 423/492 |
| 228,093 | 5/1960 | Australia ........................... 423/492 |

*Primary Examiner*—Edward Stern
*Attorney, Agent, or Firm*—McDougall, Hersh & Scott

[57] ABSTRACT

The invention relates to a process for the separation of zirconium, and hafnium tetrachlorides from mixtures thereof. The process according to the invention consists of selectively absorbing zirconium tetrachloride and hafnium tetrachloride vapors in a solvent medium circulating counter-current to these vapors in a distillation column, wherein the solvent consists of a molten chloroaluminate and/or chloroferrate of potassium. The process described may be used to obtain hafnium-free zirconium tetrachloride which may then be used to prepare nuclear-grade zirconium, and hafnium tetrachloride containing little zirconium.

9 Claims, 1 Drawing Figure

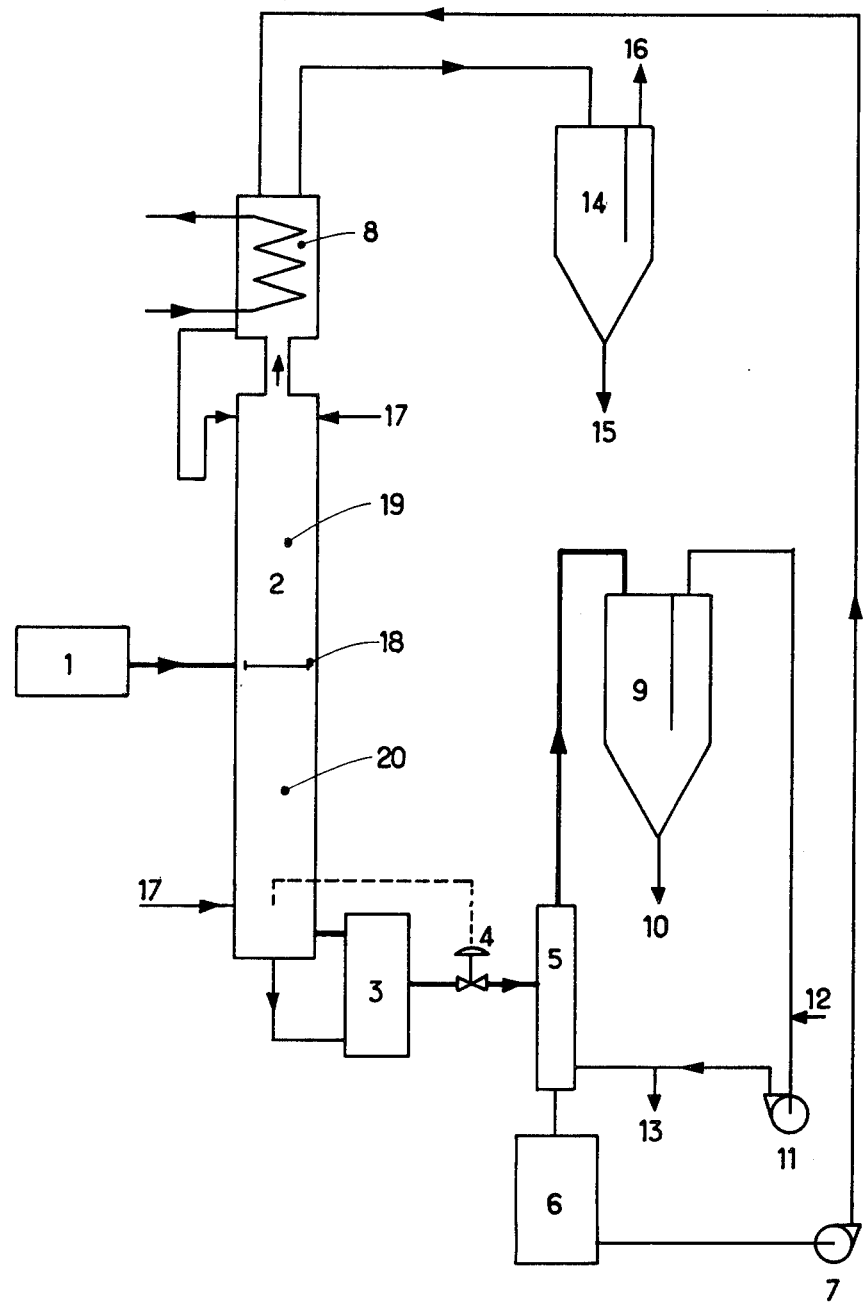

PROCESS FOR THE SEPARATION OF ZIRCONIUM AND HAFNIUM TETRACHLORIDES FROM MIXTURES THEREOF

This is a continuation, of application Ser. No. 447,902 filed Mar. 4, 1974 now abandoned.

The invention relates to a process for the separation of zirconium and hafnium tetrachlorides from mixtures thereof, such as produced by the chlorination of ores.

Zirconium ores, such as zircon, contain hafnium in proportions normally within the range between one and three percent with respect to total hafnium plus zirconium content, but which may be as high as twenty percent. However, the use of zirconium and its alloys in nuclear reactors demands that hatnium, which strongly absorbs thermal neutrons, be removed as completely as possible. Most uses require hafnium content to be less than 200 ppm or even, in certain cases, very much less than 100 ppm. Conversely, where it is desired to take advantage, in certain types of nuclear reactors, of the high thermal neutron cross-section, of hafnium, the zirconium content of the latter should be less than 4.5%.

Zirconium and hafnium compounds exhibit very similar physical and chemical properties and many methods of separation have been proposed. Those employed on an industrial scale are (1) liquid-liquid extraction using an organic solvent to which a substance has been added which increases the coefficient of partition between the two liquid phases of zirconium and hafnium compounds, and (2) fractional crystallization of aqueous solutions of alkali metal fluozirconates and fluohafnates. These processes are very costly in terms of labor, investment in plant and equipment, and consumption of power and materials, and involve the treatment of large quantities of highly-polluting effluents.

Other methods have been proposed which are based on the principle of extractive distillation and consist of counter-current circulation, in a plate column, of hafnium and zirconium tetrachlorides in the vapor state and a liquid exhibiting more solvent power with regard to one of the two tetrachlorides. French Patent 1,537,218, for example teaches that a molten mixtue of sodium chlorozirconate and chlorohafnate may be employed as a selective solvent, the hafnium tetrachloride content of the vapor phase and the zirconium tetrachloride content of the liquid phase, respectively, being increased. In order, however, to obtain economically acceptable separation efficiencies, the process has to be operated at a pressure of not less than five bars and temperatures which may be as high as 700° C at some parts of the apparatus. Again, since the solvent itself contains zirconium, it is not easy directly to obtain hafnium tetrachloride containing no zirconium tetrafluoride at the head of the column. U.S. Pat. No. 2,816,814 teaches that molten anhydrous stannous chloride may be employed as a solvent for zirconium and hafnium tetrachlorides and true fractional distillation carried out.

Nevertheless, the operation of the various processes described poses problems which have not yet been fully overcome when carried out on an industrial scale.

The process according to the invention falls into the category of extractive distillation and employs a new type of selective solvent which is much more efficient than those used in the prior art and can furthermore be operated at little more than atmospheric pressure and temperatures of 250° C to 550° C.

In the process of this invention, which enables zirconium and hafnium tetrachlorides continuously to be separated by selective absorption in the vapor state by a molten solvent circulating counter-current to the tetrachlorides in a distillation column, the solvent is an alkali metal chloroaluminate or chloroferrate or a mixture thereof wherein the molar ratio of aluminum chloride and/or ferric chloride to alkali metal chloride is in every case greater than 0.95 but less than 1.30 and preferably between 1.04 and 1.10, operating pressure is less than five bars and preferably substantially equal to atmospheric pressure, and operating temperature is within the range of 250° C to 550° C.

It has also been found that potassium is preferred over sodium as the alkali metal in the solvent and, surprisingly, confers upon the solvent all those properties which are most favorable in terms of the total solubility of the zirconium and hafnium chlorides, their relative volatility and stability, the regularity of operation of the distillation unit, and hence the consistency of the degree of purity of the hafnium-free zirconium chloride obtained.

Hence, an essential feature of the invention relates to the use of a virtually stoichiometric solvent having the formula $nAlCl_3 \cdot pMeCl$, or $nFeCl_3 \cdot pMeCl$, or $n(AlCl_3 \cdot FeCl_3) \cdot pMeCl$, wherein the ratio n/p is maintained above 0.95 and preferably between 1.04 and 1.10 by continuous or intermittent addition of aluminum and/or ferric chlorides, either by direct injection of their vapors into the distillation column, or indirect injection with the zirconium and hafnium vapors. The term MeCl represents an alkali metal chloride and the table following demonstrates that potassium salts are far preferable to sodium salts for the purposes of the process according to the invention.

| Solvent | Temperature pressure in distillation column | | Solubility of $(Zr \cdot Hf)Cl_4$ per 100 g. solvent |
| --- | --- | --- | --- |
| | ° C | torr | |
| $KAlCl_4$ | 345° | 750 | 42.3 g |
| | 345° | 920 | 46.8 g |
| $NaAlCl_4$ | 345° | 750 | 31.0 g |
| | 345° | 920 | 35.1 g |
| $KFeCl_4$ | 350° | 750 | 112.5 g |
| $NaFeCl_4$ | 350° | 750 | 91.5 g |

A further characteristic of the invention resides in the use made of the very substantial variations with temperature (over the range 250°/550° C) and pressure in the vapor pressures and solubilities of the zirconium and hafnium tetrachlorides dissolved in the solvents described, thus enabling the solvents to be very efficiently regenerated and, at the same time, dissolved $ZrCl_4$ and $HfCl_4$ to be recovered by using either a counter-current flow of nitrogen or reduced pressure at the relatively low temperatures concerned. Thus, at 500° C under 740 torr, the solubility of $ZrCl_4$ is 52 grs/100 grs of $KAlCl_4$. It falls to 0.6 grs/100 grs under a pressure of 13 torr.

By virtue of these substantial variations in solubility with temperature and pressure, the process will readily yield $ZrCl_4$ containing less than 30 ppm $Hf/Hf + Zr$ and $HfCl_4$ containing less than 4.5% $Zr/Zr + Hf$.

A further characteristic of the invention resides in the use, at the top of the distillation column, of an absorber/condenser unit designed to retain solvent passing through the apparatus, dissolve therein the zirconium and hafnium tetrachloride vapors and stabilize head temperature of the column, thus producing a phase enriched in hafnium tetrachloride by condensation of the vapors leaving the absorber/condenser unit on saturation of the solvent passing through the same. This apparatus operates similarly to a virtually isothermal distillation column, i.e. cooled by a thermostatic fluid.

A further characteristic of the invention resides in the fact that zirconium tetrachloride is separated from the solution, at the bottom of the distillation column, by methodical counter-current entrainment in a solvent regeneration circuit yielding hafnium-free zirconium tetrachloride vapor and zirconium-free solvent, which is recirculated to the top of the distillation column via the absorber/condenser unit.

The invention is illustrated but not limited by the following examples and the appended drawing which represents the apparatus employed to separate $ZrCl_4$ and $HfCl_4$ by the process according to the invention.

A column 2 is supplied with zirconium tetrachloride vapor containing hafnium from a sublimation unit 1. A pump 7 causes the solvent to circulate through an absorber/condenser unit 8, column 2, a boiler 3, an exhaustion column 5, and then a reservoir 6. The zirconium and hafnium tetrachloride vapors from column 2 saturate the solvent recirculated to the absorber/condenser unit 8, the latter being cooled by means of a thermostatic circuit (not shown) which regulates its temperature to around 350°.

The zirconium tetrachloride vapors produced in the boiler 3 move up the distillation column 2 counter-current to the saturated solution, the hafnium tetrachloride content of which reduces as it moves down column 2. The temperature of the boiler 3 is regulated to approximately 500° C, so that the solvent leaving the boiler via a valve 4 contains only a few percent of zirconium tetrachloride.

In the exhaustion column 5, virtually all the zirconium tetrachloride is removed from the solvent by means of nitrogen which is passed through the solvent at a certain rate (ca. 1 to 4 cu.m./hr. based on production of 6 to 10 kg/hr of hafnium-free zirconium tetrachloride) and recycled by a booster pump 11. The nitrogen entrains $ZrCl_4$ vapor into a condenser 9 and hafnium-free $ZrCl_4$ is drawn off at 10.

It can be seen from the drawing that, instead of introducing nitrogen at 12 and circulating this via the booster pump 12, the solvent could be regenerated and zirconium tetrachloride recovered at 10 by substituting a vacuum pump for the booster pump 11.

A certain quantity of hafnium-rich $ZrCl_4$ is produced by absorber/condenser 8 and is drawn off at 15 after condensation in a condenser 14 connected to atmosphere by a vent pipe 16.

EXAMPLE 1

If the solvent used has a molar ratio of $AlCl_3$ to KCl of 0.93/1, approximately 7.3 kg/hr of $ZrCl_4$ containing 350 ppm Hf/Hf + Zr will be collected at 10 and approximately 0.5 kg/hr of $ZrCl_4$ containing 31.3% Hf/Hf + Zr at 15. Hence, this method of operation is not suitable for the production of $ZrCl_4$ which is low enough in hafnium for subsequent production of "nuclear" grade zirconium containing less than 200 ppm of hafnium. The tetrachloride fed in at 1 contains 2.2% Hf/Hf + Zr.

The following examples, however, describe operating procedures in accordance with the invention:

EXAMPLE 2

The solvent referred to above was enriched with respect to $AlCl_3$ by injection of vapor through a branch pipe 17 so as to raise the molar ratio of $AlCl_3$ to KCl from 0.93/1 to 1.08/1. Using the same initial tetrachloride, it was found possible to take off (at 10): 6.6 kg/hr of $ZrCl_4$ containing 25 ppm Hf/Hf + Zr, and (at 15): 0.8 kg/hr $ZrCl_4$ containing 19.2% of Hf/Hf + Zr.

EXAMPLE 3

An installation in accordance with the drawing was supplied with $ZrCl_4$ containing 0.1% Hf/Hf + Zr. It was then found possible to take off (at 10): 7.1 kg/hr of $ZrCl_4$ containing 1.0–1.1 ppm Hf/Hf + Zr, determination of which was possible only by using neutron activation. $ZrCl_4$ containing 1.3% Hf/Hf + Zr was drawn off at a rate of 0.6 kg/hr from the head condenser 14.

EXAMPLE 4

In an installation in accordance with the drawing, position of the column feed plate 18 was modified in such a way that the enrichment section 19 comprised 2.4 times as many plates as the exhaustion section 20. The column was supplied with an $HfCl_4/ZrCl_4$ mixture containing 27.5% Hf/Hf + Zr.

HfCl containing only 1.9% Zr/Zr + was drawn off at a rate of ca. 1.5 kg/hr from the top of the column 15, while $ZrCl_4$ containing 2.7% Hf/Hf + Zr suitable for recirculation in accordance with Example 1 above was drawn off at 10 at a rate of ca. 6.1 kg/hr.

EXAMPLE 5

The installation in accordance with the drawing and Example 1 was drained of solvent ($AlCl_3$.KCL) and this replaced by an $FeCl_3$.KCl solvent having a molar ratio n/p of 1.04/1.

Column 2 was supplied from the sublimation unit 1 with $ZrCl_4$ vapor containing 2.2% of Hf/Hf + Zr. Approximately 7.0 kg/hr of $ZrCl_4$ containing 150 ppm Hf/Hf + Zr was drawn off at 10, and 0.4 kg/hr of $ZrCl_4$ containing 35.2% Hf/Hf + Zr drawn off at 15.

We claim:

1. A continuous process for the separation of zirconium and hafnium tetrachloride from mixtures thereof by selective absorption in the vapor state for recovering a zirconium tetrachloride having less than 200 ppm hafnium comprising the steps of passing the mixture of zirconium and hafnium tetrachloride in the vapor state through a contact zone in countercurrent flow with a molten solvent selected from the group consisting of an alkali metal chloroaluminate, an alkali metal chloroferrate and mixtures thereof, in which the alkali metal chloroaluminate has the formula $nAlCl_3.pMeCl$ and the alkali metal chloroferrate has the formula $nFeCl_3.pMeCl$ in which Me is an alkali metal and n and p are the number of moles and in which the ratio of n/p is maintained above .95 but below 1.30, and maintaining the temperature within the range of 250°–550° C and the pressure below 5 bars in the contact zone, whereby zirconium tetrachloride is adsorbed in the solvent flowing in one direction through the contact zone while hafnium chloride continues to flow as an enriched vapor phase in the other contact zone, removing and condensing the enriched phase of hafnium tetrachloride from one end portion of the contact zone, removing the zirconium tetrachloride enriched solvent phase from the other end of the contact zone, and separating from the solvent phase a purified zirconium tetrachloride having less than 200 ppm hafnium, and said process including the step of recycling the solvent to the contact zone and adding $AlCl_3$ when the solvent is an alkali metal chloroaluminate and $FeCl_3$ when the solvent is an alkali metal chloroferrate, and mixtures of $AlCl_3$ and $FeCl_3$ when the solvent is a mixture of alkali metal chloroaluminate and alkali metal chloroferrate to maintain the molar ratio of n/p.

2. A process as claimed in claim 1 in which the molar ratio of n/p is maintained within the range of 1.04 to 1.10.

3. A process as claimed in claim 1 in which the operating pressure is substantially equal to atmospheric pressure.

4. A process as claimed in claim 1 wherein Me is potassium.

5. A process as claimed in claim 1, which includes extracting hafnium-free zirconium tetrachloride by an inert carrier gas, and subsequently recovered by means of a condenser.

6. A process as claimed in claim 5 in which the inert carrier gas is nitrogen.

7. A process as claimed in claim 1, wherein the hafnium-free zirconium tetrachloride is extracted at reduced pressure and recovered by means of a condenser.

8. A process as claimed in claim 1 wherein the contact zone includes an absorber/condenser designed to retain solvent passing through said zone to dissolve therein zirconium and hafnium tetrachloride and stabilize the temperature at the head of the contact zone.

9. A process as claimed in claim 1 wherein the zirconium tetrachloride is separated from the solvent by passing nitrogen gas through the solution to vaporize off the zirconium tetrachloride, separating the vapors of zirconium tetrachloride and nitrogen, cooling the removed vapors to condense hafnium free zirconium tetrachloride, and recycling the nitrogen gas to the vaporizer.

* * * * *

UNITED STATES PATENT OFFICE
CERTIFICATE OF CORRECTION

Patent No. 4,021,531   Dated May 3, 1977

Inventor(s) Paul Besson et al

It is certified that error appears in the above-identified patent and that said Letters Patent are hereby corrected as shown below:

column 4, line 9, change "6.6" to "6.5"

Signed and Sealed this nineteenth Day of July 1977

[SEAL]

Attest:

RUTH C. MASON
Attesting Officer

C. MARSHALL DANN
Commissioner of Patents and Trademark